US010913223B2

(12) United States Patent
Villalon et al.

(10) Patent No.: US 10,913,223 B2
(45) Date of Patent: Feb. 9, 2021

(54) FIBRE REINFORCED COMPOSITES

(71) Applicants: Hexcel Holding GMBH, Pasching (AT); Hexcel Composites SAS, Dagneux (FR)

(72) Inventors: Esteban Villalon, Dagneux (FR); Andreas Gabor, Pasching (AT)

(73) Assignees: HEXCEL HOLDING GmbH, Pasching (AT); HEXCEL COMPOSITES SAS, Dagneux (FR)

( * ) Notice: Subject to any disclaimer, the term of this patent is extended or adjusted under 35 U.S.C. 154(b) by 243 days.

(21) Appl. No.: 15/776,811

(22) PCT Filed: Nov. 24, 2016

(86) PCT No.: PCT/EP2016/078737
§ 371 (c)(1),
(2) Date: May 17, 2018

(87) PCT Pub. No.: WO2017/089495
PCT Pub. Date: Jun. 1, 2017

(65) Prior Publication Data
US 2018/0326678 A1 Nov. 15, 2018

(30) Foreign Application Priority Data
Nov. 25, 2015 (EP) .................................... 15196384

(51) Int. Cl.
*B29C 70/08* (2006.01)
*B29B 17/00* (2006.01)
(Continued)

(52) U.S. Cl.
CPC ........ *B29C 70/545* (2013.01); *B29B 17/0026* (2013.01); *B29C 70/081* (2013.01); *B29C 70/14* (2013.01); *B29C 70/46* (2013.01); *B29K 2063/00* (2013.01); *B29K 2105/0872* (2013.01); *B29K 2105/0881* (2013.01); *B29K 2105/26* (2013.01); *B29K 2307/04* (2013.01); *Y02W 30/62* (2015.05)

(58) Field of Classification Search
None
See application file for complete search history.

(56) References Cited

U.S. PATENT DOCUMENTS

2010/0239856 A1 9/2010 Olson et al.

FOREIGN PATENT DOCUMENTS

JP 0768580 A * 3/1995
JP H07 68580 A 3/1995
(Continued)

OTHER PUBLICATIONS

JP H07 68580 A—machine English translation.

*Primary Examiner* — Cachet I Proctor
(74) *Attorney, Agent, or Firm* — W. Mark Bielawski

(57) ABSTRACT

A reinforcing composite comprising a plurality of layers of reinforcing composite material forming a stack wherein at least one layer of the stack comprises a moulding compound (114) comprising consolidated resin impregnated fiber elements, wherein the resin impregnated fiber elements are obtained from off-cuts or scrap material (112) derived from cutting single layers of reinforcing composite material and/or stacks comprising multiple layers of reinforcing composite material (110).

2 Claims, 5 Drawing Sheets

(51) Int. Cl.
  *B29C 70/54*   (2006.01)
  *B29C 70/46*   (2006.01)
  *B29C 70/14*   (2006.01)
  *B29K 105/08*   (2006.01)
  *B29K 63/00*   (2006.01)
  *B29K 105/26*   (2006.01)
  *B29K 307/04*   (2006.01)

(56) References Cited

FOREIGN PATENT DOCUMENTS

WO   2013/135911   9/2013
WO   WO-2013135911 A1 *   9/2013   ........... B29C 70/545

* cited by examiner

FIBRE REINFORCED COMPOSITES

BACKGROUND OF THE INVENTION

Field of the Invention

The present invention relates to improvements in or relating to fibre reinforced composites.

Composites comprising fibre reinforced materials and in particular prepregs comprising fibres and thermosetting resins may be stacked to form preforms. These preforms are subsequently cured, for example in an autoclave, a mould and/or a vacuum bag to form a reinforced composite material. Such composite materials are known, they are lightweight and of high strength and are used in many structural applications such as in the automobile and aerospace industries and in industrial applications.

Prepreg is the term used to describe fibres and/or fabric impregnated with a resin in the uncured state and ready for curing. The fibres may be in the form of tows or fabrics. The tows or fabrics generally comprise a plurality of thin fibres called filaments. The selection of fibrous materials and resins employed in the prepregs depends upon the properties required of the cured composite material and also the use to which the composite is to be put.

Various methods have been proposed for the production of prepregs, one of the preferred methods being the impregnation of a moving fibrous web with a liquid, molten or semi-solid uncured thermosetting resin. The prepreg produced by this method is then cut into sections of desired dimensions and a stack of the sections is moulded and cured by heating to produce the final fibre reinforced laminate. Curing may be performed in a vacuum bag which may be placed in a mould for curing. Alternatively, the stack may be formed in a closed mould and cured directly in the mould by heating (compression moulding), such as in the press moulding of laminates for automotive body structural parts.

One preferred family of resins for use in such applications are curable epoxy resins and curing agents and curing agent accelerators are usually included in the resin to shorten the cure cycle time. Epoxy resins are highly suitable resins although they can be brittle after cure causing the final laminate to crack or fracture upon impact and it is therefore common practice to include toughening materials such as thermoplastics or rubbers in the epoxy resin.

The prepreg can be in the form of an integral layer of reinforcement material or it can be in the form of elements oriented in random directions to form a quasi-isotropic material layer. Multiple prepreg layers or elements are conventionally combined to form composite laminate structures. The prepreg layers may be arranged in parallel, randomly in an in-plane direction (quasi-isotropic) or as isotropic or quasi-isotropic prepreg elements.

Following formation of the laminate, it may be cut to the required shape. This produces off-cuts which can be wasteful and costly.

The composites can be used to provide strength and reinforcement to articles such as automobiles, aircraft, railroad vehicles, boats and ships. In particular they may be laminated to metal components to provide reinforcement while reducing the weight thereof. The degree of reinforcement that is required may vary along the length or across the width of a component. For example, certain regions in a component may need extra strength as they may be more vulnerable to crash or they may be at a location where any external force that may be applied to the article is greater than at other locations.

To date the composite has been provided across the entire component in an amount that provides the maximum required reinforcement albeit that the maximum reinforcement may be required only at certain locations of the component. This is wasteful and costly as more composite material than is required is used and it also results in an unnecessary and undesirable increase in the weight of the component. This can lead to increased fuel consumption in vehicles and the like.

In the design of vehicles such as automobiles, boats and the like stresses to which the vehicle may be subjected are evaluated and the degree of reinforcement required in certain areas.

The composite may be further adapted by cutting to suit particular applications. This has the disadvantage of creating scrap composite material which can be wasteful and inefficient. For example, in some cases up to 50% of the reinforcement material may be lost as scrap material or off-cuts, which is very wasteful, both in economic and environmental terms.

The present inventions aim to obviate or at least mitigate the above described problems and/or to provide improvements generally.

BRIEF SUMMARY OF THE INVENTION

According to the inventions there is provided a reinforcing composite, a moulding compound and a method as defined in any one of the accompanying claims.

According to the present invention there is provided a reinforcing composite comprising a plurality of layers of reinforcing composite material forming a stack wherein at least one layer of the stack comprises a moulding compound comprising consolidated resin impregnated fiber elements, wherein the resin impregnated fiber elements are obtained from off-cuts or scrap material derived from cutting single layers of reinforcing composite material and/or stacks comprising multiple layers of reinforcing composite material.

The present invention further provides a moulding compound comprising consolidated resin impregnated fiber elements, wherein the resin impregnated fiber elements are obtained from off-cuts or scrap material derived from cutting single layers of reinforcing composite material and/or stacks comprising multiple layers of reinforcing composite material.

The present invention further provides a method of manufacturing a moulding compound comprising
 a) providing one or more single layers of reinforcing composite material and/or one or more stacks comprising multiple layers of reinforcing composite material;
 b) cutting the one or more single layers and/or one or more stacks to obtain a net-shape preform and off-cuts or scrap material;
 c) separating the off-cuts or scrap material into resin impregnated fiber elements;
 d) consolidating the resin impregnated fiber elements to form a layer.

The present invention further provides a method of manufacturing a reinforcing composite comprising providing a plurality of layers of reinforcing composite material forming a stack, providing a layer of a moulding compound according to the present invention, or obtained by means of a method of the present invention, and combining the stack and the layer of moulding compound to form the reinforcing composite.

The resin impregnated fibre elements forming the moulding compounds of the present invention may be obtained from off cuts or scrap material derived from single layers of reinforcing composite material and/or one or more stacks comprising multiple layers of reinforcing composite material, but preferably they are derived from off-cuts or scrap material comprising multiple layers of reinforcing composite material.

Preferably, the off-cuts or scrap material are cut to form the resin impregnated fiber elements, preferably as single ply elements. Any suitable means for cutting and/or separating single and/or multiple layers of reinforcing composite material may be used. Particularly suitable methods of separating multiple layers of reinforcing composite materials include temperature treatment and/or applying stress, such as the methods disclosed in WO 2016/034451.

The resin impregnated fiber elements may be consolidated to form the moulding compound in any convenient manner, such as by heating, for example to temperatures of from 60° C. to 80° C.

In an embodiment of the present invention, the moulding compound is in the form of a sheet or layer.

Preferably, the individual resin impregnated fiber elements comprise unidirectional fibers.

In an embodiment of the present invention the resin impregnated fiber elements are randomly orientated in the moulding compound. Alternatively, the resin impregnated fiber elements are orientated before being consolidated to form the moulding compound.

The layers of reinforcing composite material forming the reinforcing composites of the present invention, and from which the off-cuts or scrap material from which the moulding compounds of the present invention are formed may be derived, may be any conventional composite materials comprising fibrous reinforcement materials and resin materials. The resins may be thermoforming resins or thermoplastic resins. Where the resins are thermoforming resins, the layers of reinforcing composite material are preferably uncured when the off-cuts or scrap materials are derived therefrom.

In a preferred embodiment of the present invention the layers of reinforcing composite material forming the stack of the reinforcing composite of the invention have the same composition as the off-cuts or scrap material from which the resin impregnated fiber elements forming the moulding compound are derived. In alternative embodiments however, the layers of reinforcing composite material forming the stack of the reinforcing composite of the invention may have a different composition to the off-cuts or scrap material from which the resin impregnated fiber elements forming the moulding compound are derived, for example because the off-cuts or scrap are derived from reinforcing composite materials having different compositions to the composition of the layers forming the stack and/or because additional resin has been added to the off-cuts or scrap during the formation of the moulding compounds.

In a preferred embodiment, the reinforcing composite materials for use in this invention comprise a composite of a reinforcement material and a resin material that is cured to produce the reinforcing material. The curing process transforms the resin from a plastic substance by a cross-linking process. Energy and/or catalysts are added that cause the molecular chains to react at chemically active sites linking into a rigid, 3-D structure. The cross-linking process forms a molecule with a larger molecular weight, resulting in a material with a higher melting point. During the reaction, the molecular weight increases to a point so that the melting point is higher than the surrounding ambient temperature, and the material forms into a solid material.

Suitable resin materials for use in the reinforcing composite materials used in the present invention may be selected from the group consisting of thermoset resins such as epoxy, cyanate ester and phenolic resins. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenediisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts. The resins may further contain a dicyandiamide (DICY) curative, a substituted urea accelerator. They may also contain an ethylene vinyl acetate copolymer.

The resin materials may comprise a toughening agent. Suitable toughening agents can be selected from liquid rubber (such as acrylate rubbers, or carboxyl-terminated acrylonitrile rubber), solid rubber (such as solid nitrite rubber, or core-shell rubbers) in the nano or macro size range, thermoplastics (such as poly (EtherSulphone), poly (Imide)), block copolymers (such as styrene-butadiene-methacrylate triblocks), High modulus particles (such as Silica) in the nano or macro size range or blends thereof.

The fibrous reinforcement material may comprise any fibrous material such as natural fibres (eg flax, hemp, straw, hay, seagrass, basalt), glass fibre, aramid, PAN or carbon fibre, or mixtures thereof, such as carbon and glass fibres. The fibrous reinforcement material may also comprise multiple layers of fibrous material. Preferably, the fibrous reinforcement layers comprise oriented fibres.

The fibrous material layer may comprise a weight ranging from 55 to 10000 gsm ($g/m^2$), preferably from 100 to 8000 gsm and more preferably from 150 to 4000 gsm. The thickness of the fibrous layer may range from 0.05 mm to 10 mm, preferably from 0.1 mm to 8 mm.

The fibrous material may be unidirectional, woven, chopped, biaxial or triaxial. The fibre length may vary from 1 mm to several meters, preferably from 5 mm to 100 mm, more preferably from 10 mm to 100 mm or less.

The resin impregnated fiber elements from which the moulding compounds of the present invention are formed may be any suitable size; however, the preferred average length of the resin impregnated fiber elements is from 0.01 mm to 500 mm, more preferably from 5 mm to 100 mm, even more preferably from 10 mm to 75 mm. Similarly, the preferred average width of the resin impregnated fiber elements is from 0.05 mm to 450 mm, more preferably from 0.1 mm to 30 mm, even more preferably from 0.1 mm to 15 mm; and the thickness of the resin impregnated fiber elements preferably does not exceed four times the initial layer thickness, more preferably it does not exceed two times the initial layer thickness, even more preferably it does not exceed the initial layer thickness.

The resin impregnated fiber elements may be any suitable shape, but preferably the elements have a quadrilateral shape, more preferably a rectangular, or nearly rectangular, shape.

The moulding compounds of the present invention may be any convenient thickness, such as from one to ten times the thickness of an individual layer of reinforcing composite material from the off-cuts or scrap forming the moulding compound are derived.

In an embodiment of the present invention the moulding compound layer is employed at one or more locations within the stack that are subject to elevated in-use stress in comparison with other locations within the stack according to an in-use stress evaluation of the stack and/or to form thicker areas locally and/or ribs due to the flow behaviour of the moulding compound.

In an alternative embodiment of the present invention the plurality of layers of reinforcing composite material forming the reinforcing composite of the present invention have a defined shape and the moulding compound has the same defined shape, so that the shape of the stack is consistent. A moulding compound having a defined shape may be produced in any convenient manner, for example by preparing the moulding compound in the form of a blank and cutting a net-shaped part from the blank, or by forming the resin impregnated fiber elements into the desired shape before consolidating them to form the net-shaped part.

The moulding compound may be adapted to form particular aspects of a moulded composite part including one or more of protrusions, ribs, channels and shapes of complex geometry.

According to another aspect of the present invention, the number of layers of reinforcing composite material that are employed at locations that are potentially subject to stress is determined according to the potential stresses evaluated at those locations wherein more layers of composite material are provided at locations where there is the potential for higher stress.

The reinforcing composite of the present invention may be provided as strengthening material to any substrate particularly to metal substrates, wooden substrates, plastic substrates. The substrates may be components used in automobiles, boats, aerospace vehicles and the like. The invention therefore further provides a substrate that is reinforced by lamination with a reinforcing composite of the present invention, wherein the thickness of the reinforcing composite varies across the surface of the substrate, thicker sections of the reinforcing composite being provided at locations on the substrate that have the potential to being subject to higher stress.

The thickness of the reinforcing composite may be varied by adjusting the number of layers of reinforcing composite material provided at various locations across the surface of the substrate and/or altering the thickness of the moulding compound, for example by adjusting the thickness of the moulding compound during consolidation. The reinforcing composite may be pre-made, cured and then laminated to the substrate that is to be reinforced or layers of reinforcing composite material (such as prepreg) may be laid up on the substrate together with one or more layers of moulding compound and cured to both form the cured reinforcing composite and adhere the reinforcing composite to the substrate.

In a preferred embodiment the reinforcing composite further comprises an adhesive for adhering the reinforcing composite to the substrate. The adhesive improves the bond between the reinforcing composite and the substrate material.

The substrate material and the reinforcing composite are conjoined to form an integral material. The integral material is located in a compression mould which is adapted to mould the integral material to the desired shape followed by curing or whilst simultaneously curing the integral material.

The integral material may further comprise a release material for releasing the integral material from a mould surface. Suitable release materials may comprise polyolefin film materials. Preferably the polyolefin film material may comprise multiple layers of varying polyolefin polymers ranging from C2 (polyethylene) through to C6 and/or copolymers thereof. Other suitable release material may comprise fluorinated thermoplastic films (such as polytetrafluorethylene (PTFE), fluorinated ethylene propylene (FEP), ethylene tetrafluorethylene (ETFE), polyvinyl fluoride (PVF), chlorinated thermoplastic films such as polyvinylchloride (PVC), low surface energy thermoplastic films (such as polymethylpentene PMP), thermoplastic films chemically modified to have low surface energy (such as siloxane treated polyethylene terephthalate (PET), thin metal foils (such as aluminium), pre-cured thermoset fibre reinforced laminates, films of low melting temperature waxes (such as paraffin wax) or synthetic waxes (such as substituted amide waxes) or salts of fatty acids (such as calcium stearate), woven fibre or veil layers infused with low melting temperature waxes (such as paraffin wax) or synthetic waxes (such as substituted amide waxes) or salts of fatty acids (such as calcium stearate) or mixtures thereof. In a preferred embodiment the release film may have a release side and a non-release side.

Suitable adhesive materials may be applied in film form, as a paste, or sprayed and could be selected from the group consisting of thermoset resins such as epoxy, cyanate ester, and phenolic resins or from groups consisting of thermoplastic bonding adhesives such as polyurethane, polyvinylacetate (PVA) and PVC. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition such as carboxy terminated butyl rubber (CTBN/RAM) combinations where the olefinic nature of the modifier enhances enables the ability of the adhesive to absorb oil from a substrate surface and form a better bond. These polymers are often further modified by a surfactant or adhesion promoting chemical. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenediisocyanate and other substituted homologues. The epoxy curing agent may be selected from Dapsone (DDS), Diaminodiphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

Preferably the adhesive comprises an epoxy resin, a dicyandiamide (DICY) curative, a substituted urea accelerator and an ethylene vinyl acetate.

The adhesive layer preferably comprises a woven fabric or scrim. The scrim controls the bond line thickness between the moulding material and the substrate material. This ensures that the adhesive cannot leech away from the surface of the substrate when the sheet moulding compound or blank is subjected to pressure during moulding. The scrim may be provided on the moulding material before the application of the adhesive layer.

In an embodiment of this invention the fibres in the reinforcing composite are aligned in different directions in the various layers of material employed at any particular location on the substrate. For example, the base section of the composite material which is of uniform thickness may comprise several layers and the orientation of the fibres within the layers may be parallel or at 90° to each other. The additional layers of composite material that are provided at the locations where the potential for high stress is perceived may be aligned at 90° to the fibres in the base layer. Table 1 below illustrates how layers of moulding materials based on unidirectional fibres may be laid up with the fibres in differing orientations.

from ambient to temperatures up to 30 to 200° C., preferably 30 to 160° C., and may be followed by a dwell stage at a fixed temperature ranging from 30 to 200° C., preferably 50 to 160° C., more preferably 80 to 150° C. for a period of time ranging from 1 s to 10 hours, preferably 10 s to 1 hour, 1 mins to 1 hour, 1 mins to 45 mins or 1 mins to 30 mins or 1 to 30 mins and/or combinations of the aforesaid periods. Following the dwell stage, the temperature is further increased to temperatures up to 60 to 200° C., preferably 60 to 160° C., followed by a cure stage at a fixed temperature ranging from 60 to 200° C., preferably 60 to 160° C., more preferably 80 to 160° C. for a period of time ranging from 1 s to 10 hours, preferably 10 s to 1 hour, 1 mins to 1 hour, 1 mins to 45 mins or 1 mins to 30 mins or 1 to 30 mins and/or combinations of the aforesaid periods.

At some time after the initial cure cycle and the moulded article has cooled to ambient temperatures it may undergo a second 'post cure' step to develop its full thermo and mechanical properties. Typical post cure cycles for the moulding material include an increase in temperature from ambient to temperatures up to 30 to 200° C., preferably 30 to 160° C., and may be followed by a dwell stage at a fixed temperature ranging from 30 to 200° C., preferably 50 to 160° C., more preferably 80 to 150° C. for a period of time

| Lay up | Ply 1 | Ply 2 | Ply 3 | Ply 4 | Ply 5 | Ply 6 | Ply 7 | Ply 8 | Ply 9 |
|---|---|---|---|---|---|---|---|---|---|
| Lay up 1 | +45° | −45° | 0° | 90° | 0° | 90° | 0° | −45° | +45° |
| (Orientation weight ply) | 150 g | 150 g | 600 g | 600 g | 600 g | 600 g | 600 g | 150 g | 150 g |
| Lay up 2 | +45° | −45° | 0° | 90° | 0° | −45° | +45° | | |
| (Orientation weight ply) | 150 g | 150 g | 600 g | 600 g | 600 g | 150 g | 150 g | | |
| Lay up 3 | +45° | −45° | 0° | 90° | 0° | −45° | +45° | | |
| (Orientation weight ply) | 150 g | 150 g | 600 g | 300 g | 600 g | 150 g | 150 g | | |

The invention is however equally applicable to composites in which the fibres within the layers have a random orientation or are parallel in all the layers. For example, the fibres may be provided as a woven fabric.

The integral material may comprise an insulating layer to prevent galvanic coupling between the substrate material and the reinforcing composite. This is particularly advantageous for metal substrates and carbon fibre reinforcement to prevent corrosion of the metal.

The adhesive layer when used may also comprise an insulating layer to prevent galvanic coupling between the substrate material and the reinforcing composite. The insulating layer in the adhesive layer may be formed by the adhesive or by another material. The insulating layer material in the adhesive may differ from the insulating layer material of the moulding material.

Insulating layers may comprise a suitable insulating layer material having a conductivity of 1 S·m$^{-1}$ or less, preferably 0.1 S·m$^{-1}$ or less, and more preferably of 0.01 S·m$^{-1}$ or less, or combinations of the aforesaid ranges. Suitable insulating materials may comprise glass fibre, flax, hemp, rubber, thermoplastics such as polyamide, or ethylene/vinyl acetate copolymers. The insulating material may be in the form of a veil, scrim of fabric.

Curing of the reinforcing composite may take place in a single stage or in multiple stages such as two, three or more stages. Curing may take place following compression moulding or during compression moulding. If curing occurs in multiple stages, one or more stages may coincide with compression moulding.

For a multistage cure, typical initial cure cycles for the reinforcing composite include an increase in temperature ranging from 1 s to 10 hours, preferably 10 s to 1 hour, 1 mins to 1 hour, 1 mins to 45 mins or 1 mins to 30 mins or 1 to 30 mins and/or combinations of the aforesaid periods. Following the dwell stage, the temperature is further increased to temperatures up to 60 to 200° C., preferably 60 to 160° C., followed by a cure stage at a fixed temperature ranging from 60 to 200° C., preferably 60 to 160° C., more preferably 80 to 160° C. for a period of time ranging from 1 s to 10 hours, preferably 10 s to 1 hour, 1 mins to 1 hour, 1 mins to 45 mins or 1 mins to 30 mins or 1 to 30 mins and/or combinations of the aforesaid periods.

However, preferably and advantageously, the article is moulded in a single step at a temperature ranging from 60 to 200° C., preferably 80 to 160° C. over a period of from 20 s to 8 minutes, preferably from 40 s to 3 minutes, more preferably from 60 s to 120 s and/or combinations of the aforesaid periods. The article may be cured or part cured. The part cured article may proceed through to cure during other subsequent production steps such as assembly or coating.

In a further embodiment of this invention the additional layers of composite material that are provided at the positions perceived to be vulnerable to high stress may be off cuts or scrap material obtained when prepregs are cut to the desired shape to provide the base reinforcement for the structure. In this way wastage can be reduced at the same time as providing the desired increased local reinforcement.

The off-cuts or scrap may be consolidated in a sheet material. The off-cuts or scrap may be cut into multiple fiber elements prior to their consolidation. The sheet material may be applied to form protrusions, channels or surfaces of complex curvature.

The invention can employ a laminate comprising multiple plies of tape material with selected areas comprising additional plies. Each ply contains one or more sections of tape (also called courses) placed parallel to each other, and each ply is fused to one or more underlying plies. The shape of each ply and the orientation, or angle, of the fibers in the ply relative to fibers in other plies in the laminate are chosen such that the final produced article will have the desired structural characteristics across its surface.

Layers may be tacked together and the method used to tack layers together and the degree to which they are tacked is another parameter that can vary in different embodiments. Methods for tacking the courses to underlying plies could include contact heating, ultrasonic welding, induction welding, laser heating, hot gasses, or other methods of adhering plies to each other. Also, the method could be used with an articulating head or a moving substrate surface, or a combination of the two positioning approaches. Although an embodiment described herein uses a fixed material placement head that is positioned over a flat substrate surface that can move in the x and y directions as well as rotate, the relative motion between the placement head and the substrate surface could also be achieved by moving the placement head or a combination of the two.

BRIEF DESCRIPTION OF THE SEVERAL VIEWS OF THE DRAWINGS

The present invention is illustrated by reference to the accompanying drawings in which

FIG. 1 shows 4 parts each having a base section (1) from which a section of material has been removed from locations (2).

DETAILED DESCRIPTION OF THE INVENTION

Figure 1:
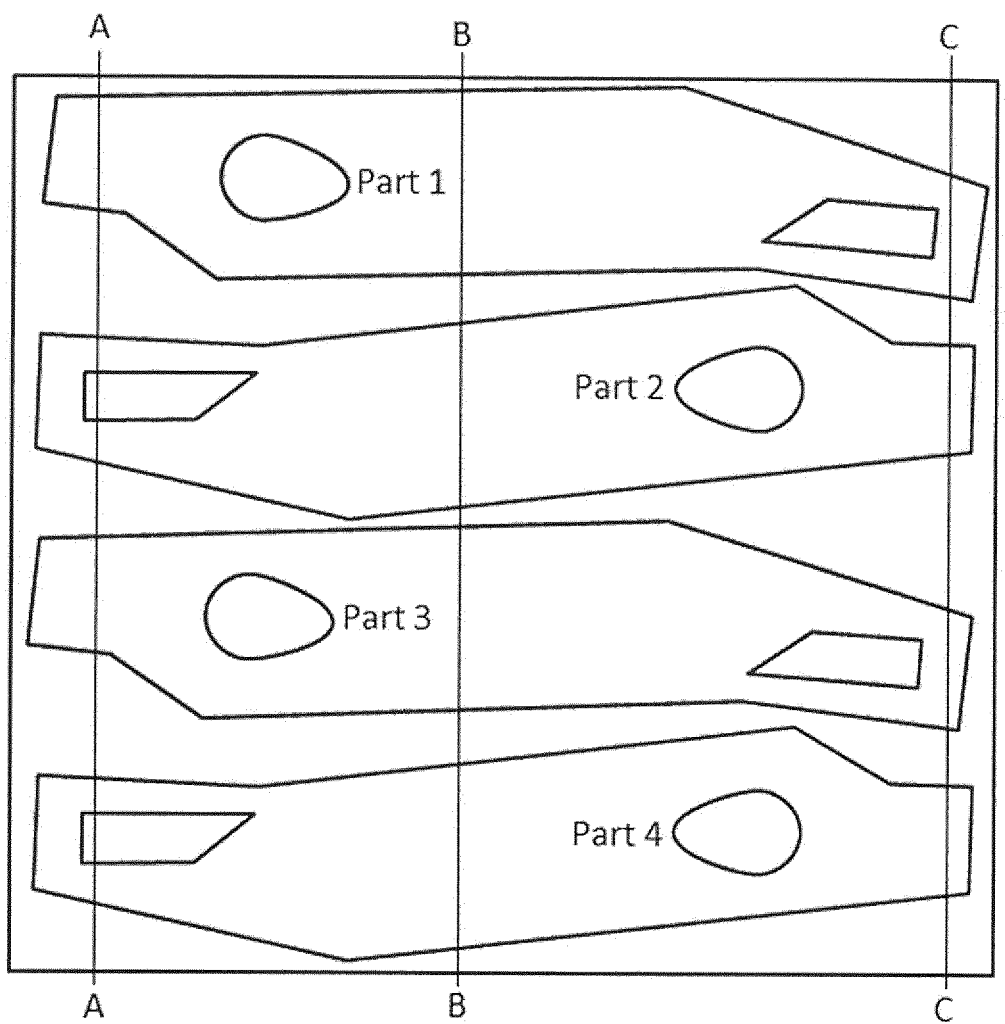
FIG. 1 shows four reinforcing parts of composite reinforcing material according to an embodiment of the invention.
Figure 2:
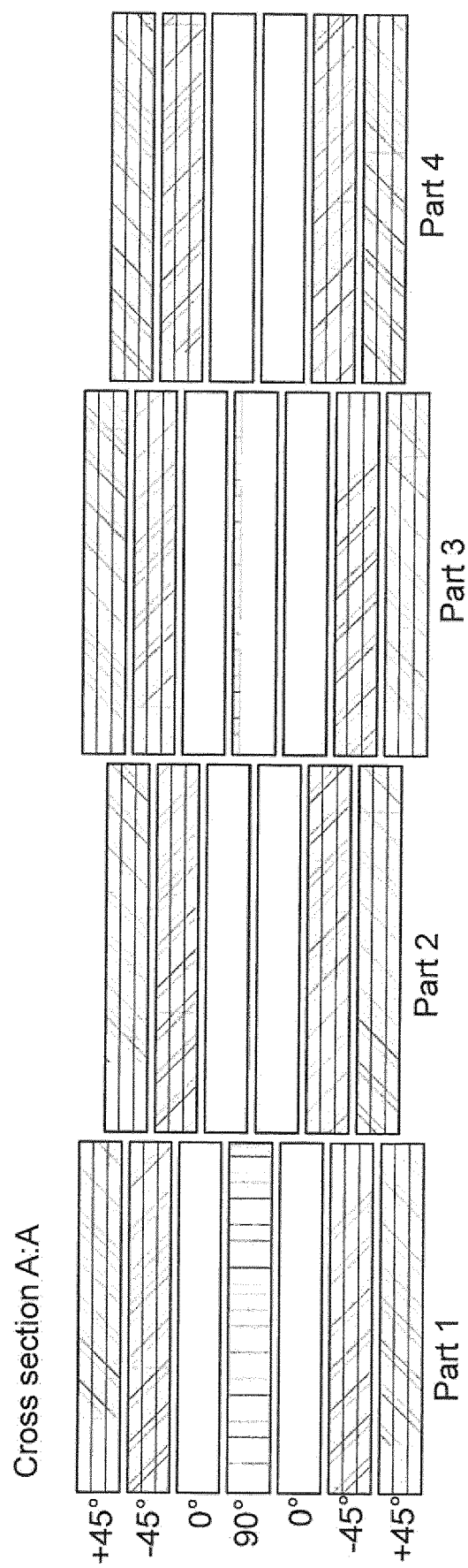
FIG. 2 is a cross section on the line A-A of FIG. 1.
Figure 3:
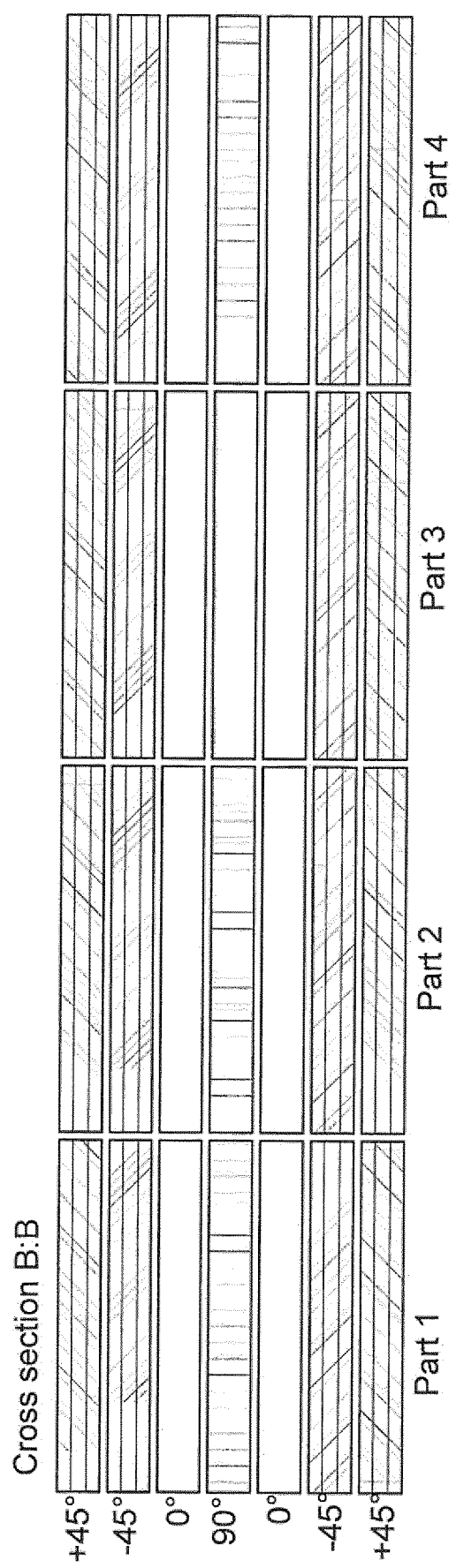
FIG. 3 is a cross section on the line B-B of FIG. 1.
Figure 4:
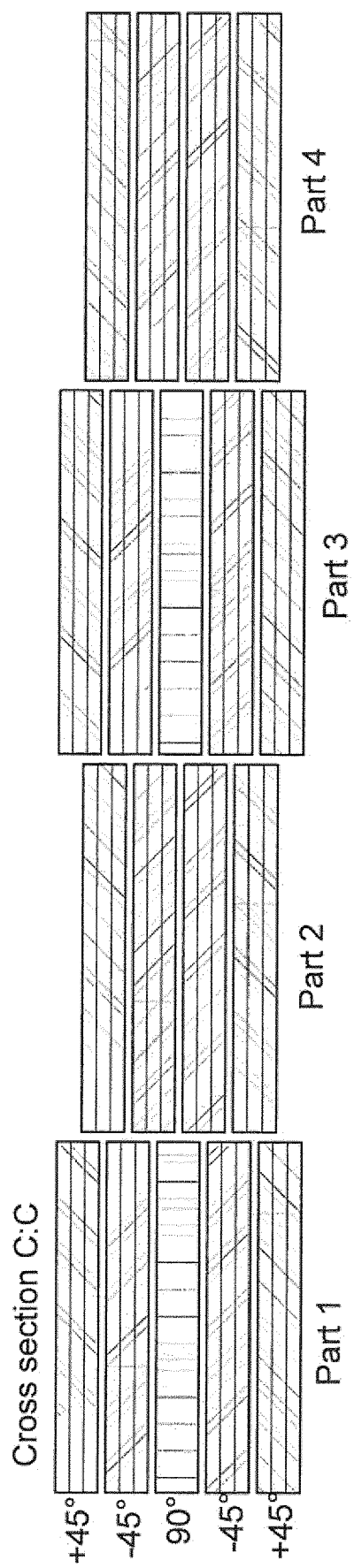
FIG. 4 is a cross section on the line C-C of FIG. 1.

FIGS. 2, 3 and 4 show how the resulting multilayer composite provides additional reinforcement along the lines B-B and localized additional reinforcement at various locations along line A-A and C-C. FIGS. 2, 3 and 4 also illustrate how the orientation of the fibres in the various layers can be varied as required. One or more of the layers of reinforcing composite materials shown in FIGS. 2 to 4 may be replaced by one or more layers of moulding compound according to the present invention.

The materials shown are suitable for lamination to a substrate such as a metal automobile component, to provide structural reinforcement with localized additional reinforcement as shown for parts 1 and 3 in FIGS. 2 and 4.

Figure 5:
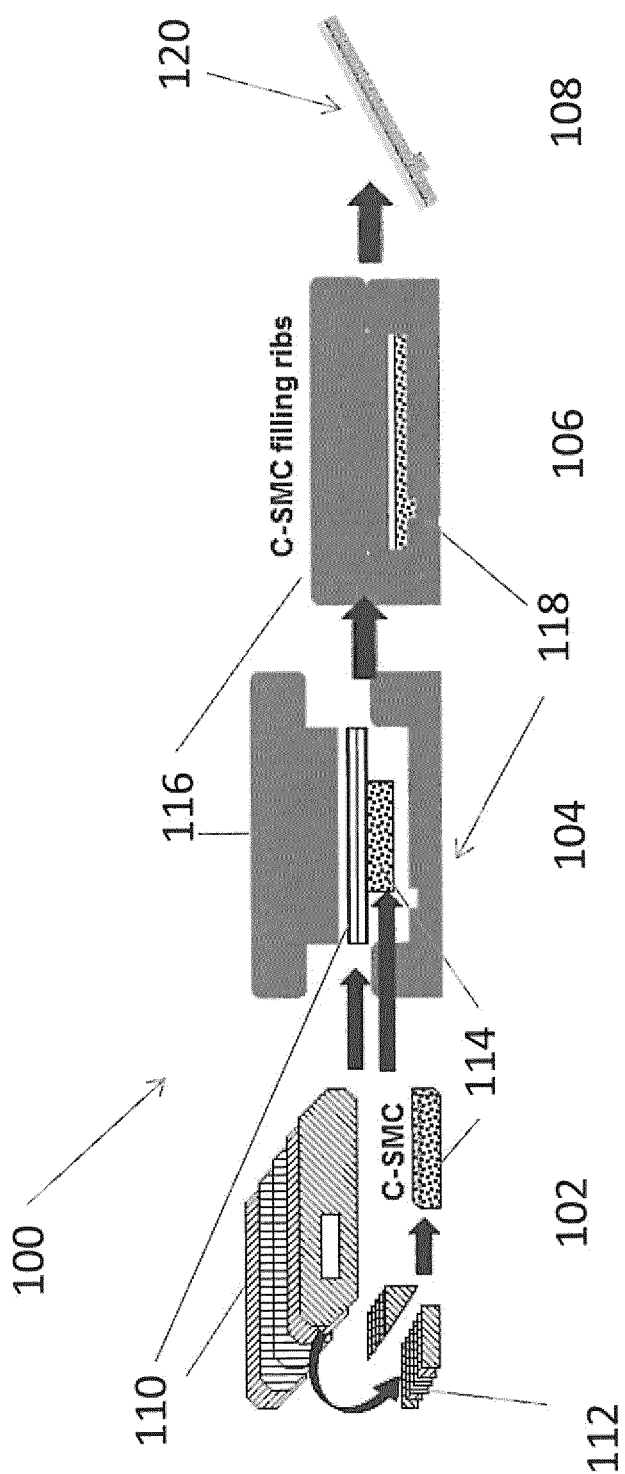
FIG. 5 shows a method of forming a moulding compound according to a further embodiment of the invention.

Moulding of a part 120 in multiple steps 102,104,106 and 108 is shown in FIG. 5.

A carbon moulding compound in sheet form 114 is combined with a reinforcing composite 110. The moulding compound 114 is formed from the off-cuts 112 of the reinforcing composite 110 which is die cut to the desired shape in step 102. The moulding compound 114 is combined with the reinforcing composite 110 and the integral moulding material is applied inside a compression mould 116 in step 104. The compression mould comprises an aperture 118 for forming a protrusion in the final moulded part 120. The aperture 118 faces the sheet moulding compound 114. Following closure of the mould 116 and applied an increased temperature over a period of time in step 106, the cured part 120 is removed in step 108.

In this way a part 120 can be molded which contains a protrusion such as a rib.

In an example of a process according to the present invention a plurality of prepreg layers comprising unidirectional carbon fibre impregnated with a curable thermosetting epoxy resin are laid up to form stacks each comprising multiple layers. The stacks are then die-cut to obtain net-shape preforms and this produces off cuts of material. These off-cuts may be processed to produce single ply resin impregnated unidirectional fibre elements, which may be mixed together randomly and arranged to form a quasi-isotropic layer. The quasi-isotropic layer may be consolidated to form a layer of moulding compound having a thickness equivalent to five prepreg layers. The moulding compound may be formed as a blank and die-cut to a desired net-shape after consolidation, or it may be formed directly in the desired net-shape before consolidation. The net-shaped layer of moulding compound may then be combined with a stack of seven layers of prepreg which has been die-cut to the desired net-shape to provide a reinforcing composite comprising seven layers of prepreg and one layer of moulding compound having the thickness of a stack of twelve layers of prepreg. This reinforcing composite may be adhered to a metal substrate to act as reinforcement for an automotive part, and the use of this process provides a large saving in waste prepreg materials, with concomitant environmental and economic benefits.

The invention claimed is:

1. A moulding compound comprising consolidated resin impregnated fiber elements, wherein the resin impregnated fiber elements are obtained from off-cuts or scrap material derived from cutting single layers of reinforcing composite material and/or stacks comprising multiple layers of reinforcing composite material; wherein
    the resin impregnated fiber elements are derived from separating off-cuts or scrap material comprising multiple layers of reinforcing composite material;
    and wherein the individual resin impregnated fiber elements comprise unidirectional fibers;
    and wherein the resin impregnated fiber elements are randomly oriented in the moulding compound.

2. A method of manufacturing a moulding compound comprising:
    a) providing one or more single layers of reinforcing composite material and/or one or more stacks comprising multiple layers of reinforcing composite material;
    b) cutting the one or more single layers and/or one or more stacks to obtain a net-shape preform and off-cuts or scrap material;
    c) separating the off-cuts or scrap material into resin impregnated fiber elements;
    d) consolidating the resin impregnated fiber elements to form a layer; further comprising:
    orientating the resin impregnated fiber elements before they are consolidated.

* * * * *